United States Patent [19]

Ionov

[11] Patent Number: 5,758,001
[45] Date of Patent: May 26, 1998

[54] SYSTEM AND METHOD FOR CONJUGATING ELECTROMAGNETIC ENERGY BEAMS BASED ON STIMULATED BRILLOUIN SCATTERING IN ASYMMETRIC WAVEGUIDES

[75] Inventor: Stanislav I. Ionov, Calabasas, Calif.

[73] Assignee: Hughes Electronics, Los Angeles, Calif.

[21] Appl. No.: 709,202

[22] Filed: Aug. 27, 1996

[51] Int. Cl.$^6$ ........................................ G02B 6/02
[52] U.S. Cl. ........................... 385/122; 385/125
[58] Field of Search ........................ 385/122–125, 385/129.13, 15.24; 65/385, 386

[56] References Cited

U.S. PATENT DOCUMENTS

| | | | |
|---|---|---|---|
| 4,791,644 | 12/1988 | Dube | 372/97 |
| 4,881,790 | 11/1989 | Mollenauer | 350/96.16 |
| 5,383,207 | 1/1995 | Culverhouse et al. | 372/28 |
| 5,604,618 | 2/1997 | Mori et al. | 385/24 |

*Primary Examiner*—Rodney B. Bovernick
*Assistant Examiner*—Ellen E. Kang
*Attorney, Agent, or Firm*—Leonard A. Alkov; William C. Schubert; Glenn H. Lenzen, Jr.

[57] ABSTRACT

A system (10) for conjugating electromagnetic energy beams adapted for use with UV, visible and infrared beams (24), and beams (24) that are depolarized or partially polarized. The inventive system (10) includes an SBS-active medium (20) and an asymmetric waveguide (27) whose guiding medium is an SBS-active medium (20). The asymmetric waveguide (27) has different propagation constants for different modes in the beam and this difference is sufficient for dispersing the modes over the length of SBS gain, thus eliminating cross-scattering between the different modes. The asymmetric waveguide (27) allows all the modes to interfere with each other locally, creating local hot spots that favor correct phases between the polarizations of a back-scattered beam (30). The inventive system (10) has focusing optics (12) for focusing the beams (24) into the SBS-active medium (20) inside the asymmetric waveguide (27) at an angle (22) with respect to an axis (18) of the waveguide (27). The focusing optics (12) focus the beams (24) and adjust the launching angle of the beams (26) to achieve the optimum conditions for discriminating the modes.

20 Claims, 1 Drawing Sheet

FIG. 1
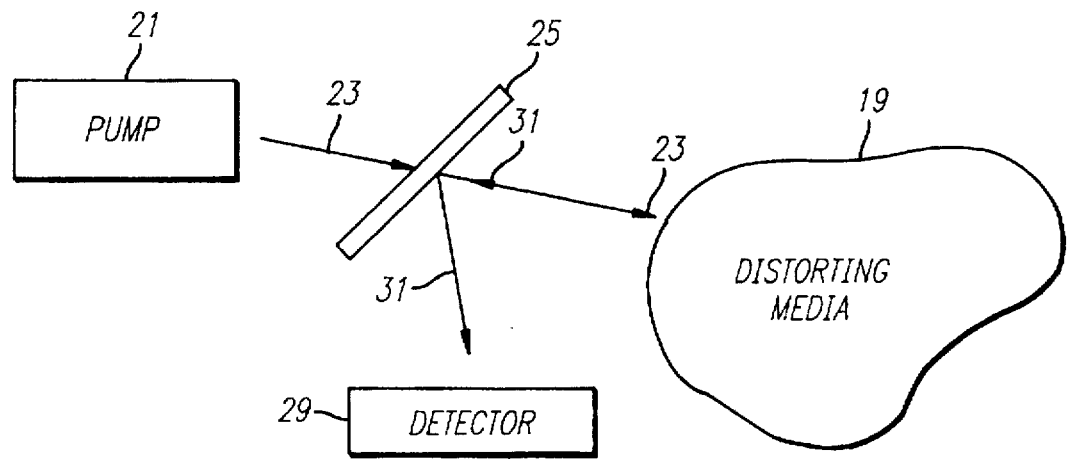
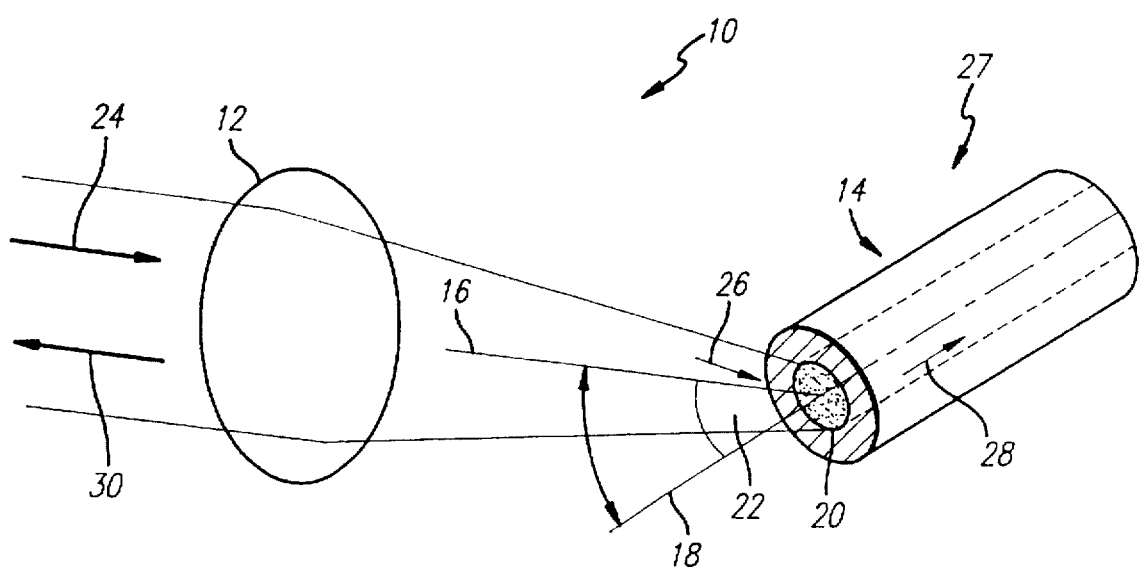
FIG. 2

SYSTEM AND METHOD FOR CONJUGATING ELECTROMAGNETIC ENERGY BEAMS BASED ON STIMULATED BRILLOUIN SCATTERING IN ASYMMETRIC WAVEGUIDES

BACKGROUND OF THE INVENTION

1. Field of Invention

This invention relates to systems for conjugating electromagnetic energy beams, and more specifically, for conjugating unpolarized or partially polarized beams.

2. Description of the Related Art

Beams of electromagnetic energy are used in a variety of applications ranging from communications and signal processing to highly directional delivery of energy via high power laser beams. Certain applications require electromagnetic energy beams to have specific characteristics including particular wavefronts and polarization states. Some of the beam characteristics may be altered during operation. For example, beams propagating through the atmosphere, thermally distorted laser media, or other non-homogeneous media are subject to changes caused by interference, diffraction and refraction. As a result, a beam reflected back by a mirror along the same path as the parent beam is often aberrated and depolarized.

A conjugated beam is a beam having the same wavefront as the parent beam but propagating in the opposite direction. Such a beam is automatically restored as it propagates back through an non-homogeneous medium.

One method of conjugating beams is stimulated Brillouin scattering (SBS). A medium that supports stimulated Brillouin scattering is termed SBS-active. Conventionally, phase conjugation is achieved by focusing a beam into a cell filled with a gas, liquid or solid that is SBS-active. A high-intensity beam traveling in an SBS-active medium induces density and refraction index changes in the medium where beam intensity is high. The incident beam scatters on the density variations producing a back-scattered beam. The back-scattered beam interferes with the incident beam causing additional density variations in the medium. Cumulatively, this interference induces a sound wave that scatters the incident beam backward into the conjugated beam. The same end result may be achieved via other non-linear effects such as four-wave mixing.

The conjugation of unpolarized light via SBS has not been possible in bulk media, i.e. in such media where the nature of beam propagation is dependent only on the media and not the container of the media. Such media are bulk media. Only the conjugation of linearly polarized beams is possible in bulk media. This conclusion is derived from two processes, namely, cross-scattering between two orthogonal linear polarization components and the lack of phase locking between the polarization components of a back-scattered beam.

Cross-scattering results when a polarization component of an incident beam is cross scattered on a sound wave created by the other polarization component. This happens when the polarization components of an unpolarized or partially polarized beam have equal propagation constants thereby inducing sound waves of identical periods. Cross-scattering distorts the wavefront of a back-scattered beam. Such cross-scattering is eliminated in birefringent media that have different propagation constants for different polarizations. Birefringent media however cannot be used for conjugating unpolarized beams because of the lack of phase locking of the polarization components of the back-scattered beam.

Birefringent bulk media, as well as bulk media in general, do not have any means for locking the relative phases of polarizations in the back-scattered beam to those in the incident beam. This is because two polarization components the back-scattered beam polarizations, which originate from noise, do not interfere with each other locally as required for phase locking. As a result, each polarization component of the back-scattered beam has arbitrary relative phase, and the superposition of each component does not compose a conjugated beam.

Phase locking of polarization components can be achieved in a cylindrical waveguide filled with an SBS-active medium. This is because the modes of a cylindrical waveguide corresponding to orthogonal linear polarizations in the free space, i.e., symmetric and asymmetric modes are not linearly polarized, allowing for their local interference. However, the symmetric and asymmetric modes have identical propagation constants in a cylindrical waveguide filled with an isotropic guiding medium i.e., a medium with a dielectric constant independent of the electric field. The identical propagation constants result in the cross-scattering that makes phase conjugation of unpolarized beams impossible.

Many applications require the conjugation of unpolarized or partially polarized beams. For such applications a method known as "Basov scheme" is usually invoked. The Basov Scheme splits an unpolarized or partially polarized beam into two beams of orthogonal linear polarizations. Following polarization rotation of one beam by 90°, both beams are combined into one linearly polarized beam that is conjugated using conventional methods. Unfortunately, Basov Schemes are difficult to align and require bulky and expensive optics.

Hence, a need exists in the art for a cost-effective, space efficient, easy to align system for conjugating unpolarized or partially polarized beams.

SUMMARY OF THE INVENTION

The need in the art is addressed by the system for conjugating electromagnetic energy beams of the present invention. In the illustrative embodiment, the inventive system is adapted for use with UV, visible and infrared beams, and beams that are unpolarized or partially polarized. The inventive system includes an SBS-active medium and an asymmetric waveguide that contains the SBS-active medium. The asymmetric waveguide has different propagation constants for different modes in the beam and this difference is sufficient for dispersing the modes over the length of SBS gain, thus eliminating cross-scattering between different modes. The asymmetric waveguide allows all the modes to interfere with each other locally, creating local hot spots that favor correct phases between the polarizations of the back-scattered beam.

In the illustrative embodiment, the inventive system has focusing optics for focusing beams into the SBS-active medium inside the asymmetric waveguide at an angle with respect to an axis of the waveguide. The focusing optics focus the beams and adjust the launching angle of the beams to achieve the optimum conditions for discriminating the modes, i.e., for maximizing mode dispersion. The axis of the focusing optics is angled between 20 and 40 degrees with respect to the axis of the waveguide for creating the optimum birefringence.

This invention provides a space-efficient, cost-effective, easy to align system and method for conjugating unpolarized or partially polarized optical beams via SBS. This goal is accomplished by directing light into an asymmetric waveguide whose guiding medium is SBS-active. An asymmetric waveguide is a guide whose perpendicular cross section is not cylindrically symmetric about its origin or whose guiding medium is birefringent or a combination thereof For illustrative purposes, we discuss an elliptical glass capillary filled with $CS_2$. Those skilled in the art will appreciate that other cross sectional shapes and SBS-active media may be utilized without departing from the scope of the present invention.

The principal difference in conjugating optical beams in an elliptical waveguide versus in a bulk medium or in a cylindrically symmetrical guide is derived from removing degeneracy between two opposite polarizations. At entrance of the waveguide of the present invention, two orthogonal polarization components of the incident beam that are parallel to the principal axis of guide's elliptical cross section excite two different groups of guiding modes. These two groups of modes—symmetric or asymmetric with respect to one of the guide's axis—have different propagation constants and therefore, induce sound gratings of different periods. As a result, undesirable cross-scattering of one polarization component on the sound grating created by the other component is eliminated.

Guiding modes of the asymmetric waveguides of the present invention are not linearly polarized, but rather have complicated polarization structures. In addition, the local electric fields of different modes are not orthogonal in general. As a result, symmetric and asymmetric modes interfere with each other locally, unlike two orthogonal polarization components in free space or in a bulk media. This local interference locks the phases of all the modes in the back-scattered beam, including the relative phases of symmetric and asymmetric modes, to those of the incident beam, thus conjugating an unpolarized or partially polarized incident beam.

The presence of symmetric and asymmetric modes, which is a characteristic of some guides including those with elliptical cross sections, is not essential for the present invention. The modes of guides with more complicated cross sections cannot be divided into symmetric and asymmetric modes. In this case, each polarization component of the incident beam excites all the modes in the guide, and phase conjugation of depolarized optical beams is guaranteed by dispersion and local interference of all individual modes rather than by the dispersion and local interference of symmetric versus asymmetric modes.

BRIEF DESCRIPTION OF THE DRAWINGS

FIG. 1 is a diagram of a system for conjugating electromagnetic energy beams constructed in accordance with the teachings of the present invention.

FIG. 2 is a diagram illustrating a waveguide press for constructing an elliptical waveguide.

DESCRIPTION OF THE INVENTION

The invention is described below in reference to the accompany drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a diagram of a system 10 for conjugating electromagnetic energy beams constructed in accordance with the teachings of the present invention. The system 10 includes focusing optics 12 having an optics axis 16 and an elliptical capillary 14 having a waveguide axis 18. The capillary 14 is filled with a medium 20 having sufficient nonlinearities to promote stimulated Brillouin scattering (SBS). The index of refraction of the medium 20 is higher than that of the capillary 14. As a result, the capillary 14 filled with the medium 20 compose a waveguide 27. The medium 20 is SBS-active. In the present specific embodiment, the medium 20 is $CS_2$. The capillary 14 is hollow glass tubing that is not cylindrically symmetric about the axis 18 of the tubing.

A source 21 generates a laser beam 23. The beam 23 passes through a beam splitter 25 and then through distorting media 19 and becomes a beam 24, which is distorted and depolarized. The focusing optics 12 are placed near the waveguide 18 and so that the optics axis 16 forms an off-axis coupling angle 22 with respect to the waveguide axis 18. The beam 24 is focused by the focusing optics 12 into the waveguide 27 at the launching angle 22, which is approximately equal to 36° degrees. This launching angle 22 results in preferential excitation of such guiding modes that have maximum birefringence. The optimum launching angle 22 is a function of the index of refraction of the guiding medium 20, and the material of the capillary 14. Those skilled in the art will appreciate that other angles may be used for this purpose without departing from the scope of the present invention.

The beam 24 becomes a focused beam 26 after being focused by the focusing optics 12. The incident beam 26 propagates inside the waveguide 27 as a beam 28 which is comprised of guiding modes of the waveguide 27.

The discussion below refers to the case when a depolarized or a partially polarized beam propagates through a medium or excites modes of a waveguide.

Table 1 Lists scattering processes that are allowed in bulk media and specific waveguides; also shown is their cumulative effect on phase conjugation. Single letters o and e represent ordinary and extraordinary linear polarizations in birefringent bulk media, respectively. For isotropic bulk media, where ordinary and extraordinary waves are indistinguishable, o and e are two arbitrary orthogonal linear polarizations. For cylindrical and elliptical waveguides, s and a denote symmetric and asymmetric modes, respectively. Two-letter combinations, i.e., oo, oe, ee, ss, sa, and aa, represent sound waves produced by interference of ordinary-ordinary, ordinary-extraordinary, extraordinary-extraordinary beams in bulk media or by symmetric-symmetric, symmetric-asymmetric and asymmetric-asymmetric guiding modes, respectively.

Processes 3A, 3B, 4A, and 4B describe cross-scattering, and the processes 5A, 5B, 6A, and 6B describe the local interference that facilitates phase locking.

TABLE 1

| Scattering Process | Isotropic Bulk Medium | Birefringent Bulk Medium | Cylindrical Guide | Elliptical Guide 27 | Cumulative Effect |
|---|---|---|---|---|---|
| 1A o → oo → o | Allowed | Allowed | | | Conjugates ordinary polarization or symmetric modes |
| 1B s → ss → s | | | Allowed | Allowed | |
| 2A e → ee → e | Allowed | Allowed | | | Conjugates extraordinary polarization or asymmetric modes |
| 2B a → aa → a | | | Allowed | Allowed | |
| 3A o → ee → o | Allowed | Not Allowed | | | Scrambles two polarizations or two types of modes |
| 3B s → aa → s | | | Allowed | Not Allowed | |
| 4A e → oo → e | Allowed | Not Allowed | | | Scrambles two polarizations or two types of modes |
| 4B a → ss → a | | | Allowed | Not Allowed | |
| 5A o → oe → e | Not Allowed | Not Allowed | | | Conjugates relative phases of two types of modes |
| 5B s → sa → a | | | Allowed | Allowed | |
| 6A e → oe → o | Not Allowed | Not Allowed | | | Conjugates relative phases of two types of modes |
| 6B a → sa → s | | | Allowed | Allowed | |

As seen from the table, isotropic bulk media support cross-scattering of one polarization component o or e on the sound grating induced by the orthogonal polarization component ee and oo, respectively as shown in processes 3A and 4A. This cross-scattering is possible because both polarization components have identical propagation constants. As a result, the wavefront of the back-scattered wave is scrambled and phase conjugation is ruined if both linear polarizations (e and o) are present in the isotropic media simultaneously.

Similar cross-scattering occurs in cylindrical guides when a depolarized or partially polarized beam is directed to a cylindrical waveguide (not shown). At the guide's entrance, each of the polarization components of the incident beam excites a specific group of modes that are classified as symmetric and asymmetric. Since both groups of modes are degenerate, i.e., they have identical propagation constants, cross-scattering of one mode type, e.g., s or a, on the grating induced by the opposite mode type, i.e., aa or ss, respectively, is unavoidable. This cross-scattering, which is described by processes 3B and 4B, distorts the wavefront of the back-scattered wave and ruins the phase conjugation if both types of modes (a and s) are present in the guide simultaneously.

Cross-scattering in birefringent media is eliminated since ordinary and extraordinary waves have different propagation constants. However, birefringent media do not have any means for locking relative phases of back-scattered waves to those in the incident beam. This derives from the fact that back-scattered waves originate from noise with arbitrary relative phases, and one polarization component does not interfere with the other component. Therefore, ordinary and extraordinary beams do not write combined gratings of the oe type, and processes 5A and 6A are not present. As a result, each polarization component of the back-scattered beam is conjugated to the corresponding polarization component of the incident beam, but their relative phases are arbitrary and virtually always different from those in the incident beam 26. Two linearly polarized conjugated beams with wrong relative phases do not compose a beam that is conjugated to the incident one.

Cross-scattering and the lack of phase locking between two polarization components, are eliminated in a asymmetrical waveguide filled with an SBS-active medium. Although the elliptical waveguide 27 is considered in the present specific embodiment, other waveguides with different cross sections may be used. At the guide's 27 entrance, two orthogonal polarization components of the incident beam 26, which are parallel to the principal axis (major axis) of the guide's 27 elliptical cross section, excite two different groups of guiding modes 28. These two groups of modes 28—symmetric or asymmetric with respect to one of the guide's axis—have different propagation constants and therefore, induce sound gratings of different periods. As a result, cross-scattering of one polarization component on the sound grating created by the other component, which is described by processes 3B and 4B, is eliminated if the guide's 27 dispersion is sufficient, i.e., if $$k_m^s - k_m^a > 2\pi g_{SBS},$$ [1.a]

where $k_m^s$ and $k_m^a$ are, respectively, the propagation constants of symmetric and asymmetric modes that are excited in the guide by the incident optical beam 26, the index m is a mode number, $g_{SBS} = \alpha I$ is the SBS gain, $\alpha$ is the normalized gain coefficient and I is the intensity of the modes 28. For $CS_2$, $\alpha = (40-70) \times 10^{-9}$ cm/GW at $\lambda = 1$ μm. If the expression 1.a is satisfied, the birefringence is sufficient to discriminate the modes, i.e., prevent cross-scattering of the modes 28 excited by the incident beam 26 over the SBS length. In the preferred embodiment, the incident beam 24 is in the frequency range of ultraviolet, visible, and infrared electromagnetic radiation and has sufficient power to promote SBS scattering.

Those skilled in the art will appreciate that the presence of symmetric and asymmetric modes, which is a characteristic of the elliptical guide 27 of the present invention, is not essential for eliminating cross-scattering, and therefore, it is not essential for the current invention. A guide constructed in accordance with the teachings of the present invention must not have degenerate modes, i.e., two distinctive combinations of modes that have identical or nearly identical propagation constants. For example, symmetric and asymmetric modes of a cylindrically symmetric waveguide represent two degenerate groups of modes. The degeneracy of symmetric and asymmetric modes of a cylindrical guide can be removed by making its cross section asymmetrical, e.g., elliptical, D-shaped or of any other complex shape, and/or by making the guiding medium birefringent. For the purposes of the present discussion, an asymmetrical waveguide is a waveguide that does not have a cylindrically symmetric perpendicular cross-section across the entire guide or that has a birefringent guiding medium or has a combination thereof.

The modes of guides with complicated cross sections cannot be classified as symmetric and asymmetric. This however does not limit the scope of this invention. In such guides, each polarization component of the incident beam excites all the modes, and phase conjugation is ascertained by dispersion of all individual modes, rather than by the dispersion of symmetric versus asymmetric ones. The requirement for sufficient dispersion is $$k_m - k_n > 2\pi g_{SBS},$$ [1.b]

where $k_m$ and $k_n$ are the propagation constants of any two guiding modes excited by the incident beam. If expression 1.b is satisfied, the birefringence is sufficient to discriminate all modes 28 excited by the incident beam 26 over the SBS length.

Phase locking of modes that correspond to two orthogonal polarizations in the free space is achieved in the elliptical guide 27 because its modes are not linearly polarized. Instead, the modes have complicated polarization structures, and local electric fields of different modes are not orthogonal in general. As a result, symmetric and asymmetric modes interfere with each other locally, unlike two orthogonal polarization components in the free space or in bulk media, and processes 5B, and 6B are possible. This local interference induces variations of density and refraction index where local electromagnetic field is strong. These variations of density and refraction index compose a grating that bares signatures of symmetric and asymmetric modes simultaneously. Both types of modes can scatter on the grating. Scattering on this combination grating (sa), which is described by processes 5B and 6B in Table 1, enhances the SBS gain of symmetric and asymmetric modes. Therefore the scattered modes have the same relative phase as that of the incident beam 26. The local interference results in the combination grating that locks the phases of all the modes in the back-scattered beam 30, including the relative phases of symmetric and asymmetric modes to those of the beam 28, thus conjugating the unpolarized or partially polarized beam 28.

Those skilled in the art will understand that the requirement of local interference between the modes is not limited to guides whose modes are characterized as symmetric and asymmetric. A waveguide constructed in accordance with the teachings of the present invention must not have two distinctive sets of modes that are orthogonal to each other across the entire perpendicular cross section. Otherwise, the two sets of modes will not interfere with each other to create the sound grating necessary for phase locking.

The conjugated beam 30 has exactly the same wave-front as the original beam 24 except that it is traveling in the opposite direction. The conjugated beam 30 returns through the focusing optics 12. As the beam 30 travels back through the distorting media 19 it automatically corrects itself for beam distortion and depolarization. The beam 30 exits the distorting media 19 as a beam 31 that then reflects off the beam splitter 25 into a detector 29. The beam 31 has the same polarization as the beam 23 and has been restored via beam conjugation as verified by the detector 29.

The dimensions of the waveguide 27 are taken to be the dimensions of the space occupied by the SBS-active medium within the capillary 14. When choosing the dimensions of the capillary 14 to conjugate a beam, several considerations must be taken into account. The dimensions should be chosen to achieve sufficient birefringence to discriminate all the modes excited by the incident beam 26 over the SBS length in accordance with expression 1.b. The intensity of the incident beam 28 should provide the gain increment of approximately 25–50 over the length of the waveguide 27. The birefringence, i.e. the difference in propagation constants for different modes in the beam 28 should be sufficient for dispersing the modes over $\frac{1}{25}$ to $\frac{1}{50}$ of the length of the guide 27. The launching angle 22 should be such that the modes with largest birefringence are excited preferentially by the incident beam 26 at the guides entrance. The focusing optics 12 should be chosen to limit four-wave mixing at high angles and non-local effects in SBS.

The birefringence should be sufficient to discriminate all the modes excited by the incident beam over the SBS length, i.e., expression 1.a or 1.b should be satisfied. Unfortunately, the birefringence of all the modes cannot be estimated analytically for waveguides of elliptical and more complex cross sections. This can be done approximately for only the fundamental modes of elliptical waveguides. In this case, $$\Delta k_o = (e^2 (NA)^2 \lambda)/((1-e^2)4\pi\rho^2)$$ [2]

where $\Delta k_{o=ko}{}^a$ is the birefringence, $k_o{}^s$ and $k_o{}^a$ are the propagation constants of the fundamental symmetric and asymmetric modes, respectively; $e^2=1-((\text{average semi-minor axis})^2/(\text{average semi-major axis})^2)$, NA is the numerical aperture of the waveguide 27, and $\rho$ is the average radius of the waveguide 27. Since gain increments in excess of 25 are required for overcoming an SBS threshold, the overall capillary length L should satisfy the following expression $$L > 25/g_{SBS} > 50\pi/\Delta k,$$ [3]

where $\Delta k$ is the characteristic birefringence of the modes excited in the guide by the incident beam.

Table 2 represents the birefringence and the corresponding waveguide length $L=50\pi/(\Delta k)$ required for discriminating the fundamental modes for several sizes of elliptical guides. In addition, $e^2=0.25$, the numerical aperture NA=0.72, and the wavelength $\lambda=1.06$ micrometers. The medium 20 is $CS_2$ and the capillary 14 is made of quartz.

TABLE 2

| Capillary Radius $\rho(\mu m)$ | Birefringence $\Delta k$ (cm$^{-1}$) | Capillary Length L = 50π/(Δk)(m) |
| --- | --- | --- |
| 10 | 13 | 0.12 |
| 30 | 1.5 | 1.07 |
| 100 | 0.13 | 12.0 |
| 300 | 0.015 | 107.0 |

The birefringence of the fundamental modes of elliptical guides presented in Table 2 represents the lower limit of that achieved in multi-mode guides. The birefringence of higher modes in multi-mode guides cannot be estimated rigorously and is left, therefore, for experimental determination. The dimensions of the waveguide 27 and of the focusing optics 12 required to achieve phase conjugation for the depolarized and aberrated beam 24 are determined experimentally with the aid of the equations [2] and [3] and taking into account the following considerations about the optimal launching angle.

To illustrate the effect of the mode number and the corresponding launching angle on the birefringence, we refer to a plane guiding layer (not shown), which is the limiting case of an infinitely oblate ellipse. In the following numerical example we use expressions given in "Waves and Fields in Optoelectronics", H. A. Haus, (Prentice Hall, Inc., Englewood Cliffs, N.J. 1984), pp. 163–177 for calculating the birefringence of TM vs. TE modes of plane guide comprised of the 200 μm layer of $CS_2$ confined between quartz walls. The TM and TE modes are excited in a guiding layer by two opposite polarization components of the incident beam. It can be easily calculated that the birefringence reaches its maximum for such modes that propagate at approximately 30° angle measured from the guides axis, which corresponds to the launching angle of ~36°. The maximum birefringence is almost four orders of magnitude larger than that for the fundamental modes that propagate along the guide's axis. The above considerations suggest that a shorter capillary length than that presented in Table 2 can be used for achieving sufficient birefringence if an optimal launching angle is used. Those skilled in the art will realize that other launching angles may prove advantageous for different guiding media and geometry.

Large-angle four-wave mixing via SBS is known in the art to be detrimental for phase conjugation. The maximum angle $\phi_{max}$ between different rays in the focused beam 26 limits the F number of the focusing optics 12 and is determined from the following equation:

$$\sin^2(\phi_{max}/4) = c\Delta\Omega/(4n\omega v_s) \quad [4]$$

where n is the refractive index of the medium 20, $\Delta\Omega$ is the Brillouin bandwidth, $v_s$ is the speed of sound and $\omega = 2\pi f$, where f is the frequency of the electromagnetic waves of the beam 24. For $CS_2$, n=1.62, $\Delta\Omega=(\frac{1}{3})ns^{-1}$, and $v_s=10^5$ cm/s resulting in a maximum angle of thirty-two degrees which limits the minimum F number, which is equal to $(\frac{1}{2})\tan(\phi_{max})$ to approximately 0.8.

Non-local effects result when local sound features created in hot spots of the pump beam 28 are washed out by escaping sound waves. Non-local effects only need to be taken into account when the smallest speckles in the beam 28 are less than approximately $v_s/\Delta\Omega = 3\times 10^{-4}$ cm. This limits the numerical aperture of the pump beam 26 resulting in a minimum F-number $F \geq 2v_s/(\lambda\Delta\Omega) \sim 1.25$, where $\lambda = 1/f$, when using $CS_2$ as the medium 20.

Taking into account the above limitations, a method for conjugating an electromagnetic energy beam according to the teachings of the present invention includes the following steps:

1. Determining the dimensions of an asymmetric waveguide required to obtain sufficient mode dispersion for discriminating all modes over an SBS length.
2. Filling an asymmetric waveguide with an SBS-active medium.
3. Determining the dimensions of focusing optics required to minimize four wave mixing at high angles and non-local effects;
4. Focusing the beam with the focusing optics at an angle with respect to the entrance of the asymmetric waveguide and optimizing this angle for maximum mode dispersion in the guide.

FIG. 2 is a diagram illustrating waveguide press for constructing an elliptical waveguide. A graphite waveguide press 32 is shown having a support 34 and a cover 36. The cover 36 has a ridge 40 that fits a groove 38 in the support 34. A hollow cylindrical tube 42 or fiber of conventional design is placed in the groove 38. The cover 36 is placed over the tube 42 so that the ridge 40 fits in the groove 38, pressing the tube 42. The press 32, and the tube 42 is placed into a nitrogen-purged oven (not shown) and heated to approximately 900 degrees Celsius.

The tube 42 softens, and the hollow interior of the tube 42 becomes asymmetric due pressure from the weight of the top 36. The tube 42 is then cooled and filled with $CS_2$ using a conventional process.

Typically, the hollow cylindrical tube 42 is glass. Most materials stick to glass at the high temperatures required for shaping the glass. Graphite however does not stick to glass tubing at such high temperatures. The oven however must be purged with an inert gas such as nitrogen, otherwise the graphite press 32 will burn.

Those skilled in the art will appreciate that a press 32 constructed of a non-graphite material may be used provided that it can withstand oven temperatures higher than 900 degrees Celsius, and provided that it will not stick to the tube 42. Also, other technologies for manufacturing asymmetrical guides may be employed.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for conjugating an electromagnetic energy beam comprising:
    a Stimulated Brillouin Scattering—active medium; and
    asymmetric guiding means containing said medium for conjugating said electromagnetic energy;
    wherein a length L of said asymmetric guiding means satisfies the following expression:

$$L > 25/g_{SBS} > 50\pi/\Delta k$$

where $g_{SBS}$ is the SBS gain of said guiding means, and $\Delta k$ is the birefringence of modes excited in said guiding means.

2. The invention of claim 1 wherein said asymmetric guiding means discriminates modes of said beam over said length.

3. The invention of claim 1 wherein said asymmetric guiding means has a shape such that no two sets of modes of said beam are mutually orthogonal across the entire perpendicular cross section of said asymmetric guiding means.

4. The invention of claim 1 wherein said beam is in the frequency range of infrared, visible, and ultraviolet electromagnetic energy.

5. The invention of claim 1 wherein said system for conjugating an electromagnetic energy beam further includes means for focusing said beam into said Stimulated Brillouin Scattering—active medium inside said asymmetric guiding means at an angle with respect to an axis of said asymmetric guiding means.

6. The invention of claim 5 wherein said means for focusing said beam includes a lens that has an F-number greater than or equal to $(\frac{1}{2})\tan(\phi_{max})$ where $\phi_{max}$ is the maximum angle between different rays of said beam.

7. The invention of claim 5 wherein said means for focusing said beam includes a lens that has an F-number greater than or equal to $2v_s/(\lambda\Delta\Omega)$, where $\Delta\Omega$ is the Brillouin bandwidth of said beam, $v_s$ is the speed of sound, $\lambda = 1/f$ where f is the frequency of said beam.

8. The invention of claim 5 wherein said Stimulated Brillouin Scattering active medium is $CS_2$.

9. The invention of claim 8 wherein said means for focusing said beam includes a lens that has an F number greater than 0.7.

10. The invention of claim 5 wherein said means for focusing has an optical axis that forms a coupling angle between 20 and 40 degrees with said axis of said guiding means.

11. The invention of claim 1 wherein said guiding means is an elliptical waveguide.

12. The invention of claim 1 wherein said guiding means is a cylindrical waveguide filled with a birefringent medium.

13. A system for conjugating an electromagnetic energy beam comprising:

means for producing a set of wave modes from said beam which interfere with each other locally, said modes having different propagation constants;

means for providing a set of back-scattered wave modes from said first and second set of wave modes that interfere with each other locally; and means for directing said back-scattered wave modes from said system as a conjugated beam;

wherein said means for directing includes an asymmetric waveguide containing said means for providing; and wherein a length L of said asymmetric guiding means satisfies the following expression:

$$L > 25/g_{SBS} > 50\pi/\Delta k$$

where $g_{SBS}$ is the SBS gain of said waveguide means, and $\Delta k$ is the birefringence of modes excited in said waveguide means.

14. The invention of claim 13 wherein said beam is in the frequency range of infrared, visible, and ultraviolet electromagnetic energy.

15. The invention of claim 13 wherein said means for producing includes a means for focusing said beam at an angle with respect to an axis of said means for directing.

16. The invention of claim 13 wherein said means for providing includes an Stimulated Brillouin Scattering—active medium.

17. The invention of claim 13 wherein said asymmetric waveguide is an elliptical waveguide.

18. The invention of claim 13 wherein said waveguide is a D-shaped waveguide.

19. The invention of claim 13 wherein said waveguide is a cylindrical waveguide and said means for providing is a birefringent guiding medium.

20. A method for constructing an asymmetric waveguide for electromagnetic energy beam conjugation comprising the steps of:

obtaining a capillary;

placing said capillary between a support and a cover of an asymmetric, temperature resistant press;

placing said capillary and said press in an oven heated to a temperature sufficient to soften said capillary enough for it to become asymmetrical;

cooling said capillary after it has become asymmetrical, so that said capillary maintains its asymmetry; and filling said capillary with a Stimulated Brillouin Scattering active medium.

* * * * *